United States Patent
McQuaig (10) Patent No.: US 8,692,417 B2
(45) Date of Patent: Apr. 8, 2014

(54) SUPPORT SYSTEM AND APPARATUS FOR SUSPENSION OF ELECTRICAL POWER CONDUCTORS

(75) Inventor: David W. McQuaig, Covington, GA (US)

(73) Assignee: The Southern Company, Atlanta, GA (US)

( * ) Notice: Subject to any disclaimer, the term of this patent is extended or adjusted under 35 U.S.C. 154(b) by 1206 days.

(21) Appl. No.: 12/563,595

(22) Filed: Sep. 21, 2009

(65) Prior Publication Data

US 2010/0090544 A1    Apr. 15, 2010

Related U.S. Application Data

(60) Provisional application No. 61/099,782, filed on Sep. 24, 2008.

(51) Int. Cl.
    *H05K 7/14*    (2006.01)
(52) U.S. Cl.
    USPC .............................. 307/149; 248/342
(58) Field of Classification Search
    USPC .......... 307/149; 174/5 R; 248/342, 229.2, 63, 248/64
    See application file for complete search history.

(56) References Cited

U.S. PATENT DOCUMENTS

| | | | |
|---|---|---|---|
| 692,529 A * | 2/1902 | Knittle | 174/160 |
| 1,180,729 A | 4/1916 | Marshall | |
| 1,668,513 A | 5/1928 | Millward | |
| 1,684,721 A | 9/1928 | Wood | |
| 2,206,471 A | 7/1940 | Taylor | |
| 2,576,238 A | 11/1951 | Rayburn | |
| 2,775,422 A * | 12/1956 | Von Herbulis et al. | 248/63 |
| 2,927,146 A | 3/1960 | Salisbury | |
| 3,135,820 A | 6/1964 | Hallett, Jr. et al. | |
| 3,149,390 A | 9/1964 | McCoy | |
| 3,211,820 A | 10/1965 | Hoffman | |
| 3,328,511 A | 6/1967 | Cagle et al. | |
| 3,547,386 A * | 12/1970 | Clarke et al. | 248/63 |
| 3,824,676 A | 7/1974 | Ebert | |
| 4,037,859 A | 7/1977 | Clements | |
| 4,707,562 A | 11/1987 | Whited | |
| 4,881,304 A | 11/1989 | Colangelo | |
| 4,987,660 A | 1/1991 | Sagucio | |
| 5,625,931 A | 5/1997 | Visser et al. | |
| 5,742,000 A | 4/1998 | Stevens | |
| 6,255,597 B1 | 7/2001 | Bowling et al. | |
| 6,505,487 B1 | 1/2003 | Garel et al. | |
| 6,730,852 B1 | 5/2004 | Puigcerver et al. | |
| 6,802,480 B1 | 10/2004 | Martello | |
| 7,062,886 B2 | 6/2006 | Auriemma | |
| 2006/0231691 A1 | 10/2006 | Edgren | |
| 2007/0119034 A1 | 5/2007 | Hickey | |

* cited by examiner

*Primary Examiner* — Fritz M Fleming
(74) *Attorney, Agent, or Firm* — Troutman Sanders LLP; Ryan A. Schneider; Dustin B. Weeks (57) ABSTRACT

A device adapted to support a jumper wire during maintenance or repairs to various elements associated with the suspension and switching of electrical power conductors on both transmission and distribution power grids. The device comprises two members of various shapes, pinned together in opposition with a pivot, to allow the opening and closing of said clamping system. The device can be manufactured of many materials in order to meet specific strength or dielectric requirements. Additionally, the shape of the device can be optimized to support a variety of objects.

19 Claims, 10 Drawing Sheets

SUPPORT SYSTEM AND APPARATUS FOR SUSPENSION OF ELECTRICAL POWER CONDUCTORS

CROSS-REFERENCE TO RELATED APPLICATIONS AND PRIORITY CLAIM

This application claims the benefit, under 35 U.S.C. §119 (e), of U.S. Provisional Patent Application No. 61/099,782, filed 24 Sep. 2008, the entire contents and substance of which is incorporated herein by reference in its entirety as if fully set forth below.

BACKGROUND

Embodiments of the present invention generally relate to hanging a variety of items using a clamping device, and more specifically, to a clamping device for safely retaining a jumper during the repair and/or maintenance of electrical transmission and distribution lines.

Electrical power distribution and transmission grids (the "grid") contain myriad components, including but not limited to wires (i.e., conductors), insulators, switches, and transformers. Most of these components must be serviced on a regular basis, and replaced when necessary, preferably without interrupting the flow of electricity. Working on live electrical wires requires extreme care and specialized tools to prevent, for example, electrocution of the lineman, shorting of the wire, or damage to grid components and surrounding property.

Repairs are often carried out using a length of wire, or conductor, to bypass an area of the grid that needs to be repaired or maintained (the "repair area"). Installation of this wire, or "jumper," enables electricity flowing through the grid to flow around the repair area, which, in turn, enables the conductor or other components in the repair area to be removed from the circuit for repair or replacement. The jumper can comprise a length of wire sufficiently long to span the repair area and of sufficient gauge to carry the voltage and current present on that portion of the grid. Due to the voltage and current present on the grid, however, the jumper generally comprises a very heavy gauge wire, which represents significant weight that must be supported during repairs.

Conventionally, the jumper is supported using a length of rope, which the lineman simply ties around the jumper and then ties to a nearby conductor, or power line, for support. Unfortunately, ropes are difficult to tie given the heavy gloves worn by linemen and can be tied improperly, both of which can cause the jumper to fall possibly causing personal injury or property damage. If the jumper falls, it can, among other things, electrocute the lineman, damage his truck and equipment, or damage property in the vicinity of the repair area.

In addition, ropes are often not electrically rated (i.e., rated for their resistance to the flow of electricity), which means linemen have no information on which to base their choice of rope. Ropes that are electrically rated typically rated only for their initial use, with their electrical rating decreasing with subsequent each use. This means that rated ropes must be replaced after each use, or represent a similar unknown to unrated ropes after their initial use.

SUMMARY

Embodiments of the present invention are directed to a device for suspending one object from another. Specifically, embodiments of the present invention are directed to a device, or jumper aid, for hanging a jumper from a power line during repair or maintenance of components associated with the transmission and distribution of power. In some embodiments, the device can be dielectrically rated, rated for its load carrying capacity, or both.

Embodiments of the present invention can also be directed to a method comprising: coupling an electrical jumper to a first conductor and a second conductor such that the first conductor and the second conductor are electrically continuous; supporting the electrical jumper from one of the first conductor and the second conductor with a pivotable device; where the pivotable device can comprise a first C-shaped element comprising a first upright portion and a second C-shaped element comprising a second upright portion; where the first C-shaped element can be disposed in a substantially opposing manner to the second C-shaped element; and where the first C-shaped element can be pivotally coupled to the second C-shaped element.

In some embodiments, the method can further comprise encircling the electrical jumper with a dielectric blanket prior to placing the electrical jumper in the pivotable device. In some embodiments, the method can also comprise encircling one of the first conductor and the second conductor with a dielectric blanket prior to placing one of the first conductor or the second conductor in the pivotable device. In some embodiments, the first and second upright portions can be disposed at an angle of between approximately 60 degrees and 120 degrees to a lower portion of the first and second C-shaped elements.

In some embodiments, the pivotable device can comprise a dielectric material. In some embodiments, the upright portions can contact one or more of the electrical jumper, the first conductor, the second conductor, or the dielectric blanket and can prevent the pivotable device from opening when loaded. In some embodiments, the upright portions can contact one or more of the electrical jumper, the first conductor, the second conductor, or the dielectric blanket and can prevent the pivotable device from opening when loaded. In some embodiments, the pivotable device can have a known weight carrying capacity. In some embodiments, an upper portion of the C-shaped elements can be shorter than a lower portion of the C-shaped elements.

Embodiments of the present invention can also comprise: an electrical jumper connected to a first conductor and a second conductor for bypassing current flow around a work area; and a pivotable device that can support the electrical jumper from one of the first conductor and the second conductor in the work area; where the pivotable device can comprise: a first C-shaped element comprising a first upright portion, and a second C-shaped element comprising a second upright portion; where the first C-shaped element can be disposed in a substantially opposing manner to the second C-shaped element; and where the first C-shaped element can be pivotally coupled to the second C-shaped element.

In some embodiments, the system can further comprise a dielectric blanket for preventing arcing between the electrical jumper, the first conductor, and the second conductor; and the dielectric blanket can be wrapped around one of the electrical jumper, the first conductor, and the second conductor. In some embodiments, the pivotable device can be substantially trapezoidal. In some embodiments, the pivotable device can be substantially rectangular. In some embodiments, the first and second upright portions can be disposed at an angle of between approximately 60 degrees and 120 degrees to a lower portion of the first and second C-shaped elements.

Embodiments of the present invention can also comprise a device for supporting the weight of an object from a support, and can comprise: a first substantially C-shaped element comprising a first end and a second end and can further comprise a first upright portion; and a second substantially C-shaped element comprising a first end and a second end and can further comprise a second upright portion; where the first end of the first substantially C-shaped element can be pivotally coupled to the first end of the second substantially C-shaped element and can enable the pivotable device to move between an open position and a closed position, the second substantially C-shaped element can be disposed in an opposing manner to the first substantially C-shaped element such that the first substantially C-shaped element and the second substantially C-shaped element can define a space therebetween, and the first and second upright portions can prevent the pivotable device from moving to the open position when a weight is supported by the pivotable device.

In some embodiments, the upright portions can contact one of the object or the support and can prevent the pivotable device from moving to the open position until the weight of the object is removed from the pivotable device. In some embodiments, the object can be an electrical jumper and the support can be a power line. In some embodiments, the first substantially C-shaped element and the second substantially C-shaped element can comprise a dielectrically rated material. In some embodiments, the pivotable device can have a rated load carrying capacity. In some embodiments, the first ends of the substantially C-shaped elements can be shorter than the second ends of the substantially C-shaped elements.

These and other objects, features, and advantages of the present invention will become more apparent upon reading the following specification in conjunction with the accompanying drawings.

DETAILED DESCRIPTION

Embodiments of the present invention can be understood more readily by reference to the following detailed description and the examples included herein. Before the embodiments of the devices and methods according to the present invention are disclosed and described, it is to be understood that this invention is not limited to the embodiments described within this disclosure. Numerous modifications and variations therein will be apparent to those skilled in the art remain within the scope of the invention. It is also to be understood that the terminology used herein is for the purpose of describing specific embodiments only, and is not intended to be limiting.

Unless otherwise noted, the terms used herein are to be understood according to conventional usage by those of ordinary skill in the relevant art. In addition to the definitions of terms provided below, it is to be understood that as used in the specification and in the claims, "a" or "an" can mean one or more, depending upon the context in which it is used.

Embodiments of the present invention are directed towards a device for supporting a number of items upon a support structure. Embodiments of the present invention are directed to a device for supporting a jumper wire during repairs performed on and around a power pole.

To facilitate an understanding of the principles and features of the invention, it is explained hereinafter with reference to its implementation in an illustrative embodiment. In particular, embodiments of the present invention are described in the context of being a support system for supporting jumper wires, or a "jumper aid," for repairs associated with electrical distribution and transmission grids (the "grid"). In some embodiments, the jumper aid can provide a compact, easy to deploy device for supporting jumpers, or other conductors, during routine maintenance and repair of grid components.

Embodiments of the invention, however, are not limited to use with power grid maintenance and repair. Rather, embodiments of the invention can be used any time a strong hanger is needed to securely suspend an object from a supporting structure. Thus, the jumper aid described herein after can also find utility, for example and not limitation, hanging a bicycle from an overhead hook.

The materials described hereinafter as making up the various elements of the jumper aid of the invention are intended to be illustrative and not restrictive. Many suitable materials that would perform the same or a similar function as the materials described herein are intended to be embraced within the scope of the invention. Such other materials not described herein can include, but are not limited to, materials that are developed after the time of the development of the invention, for example.

Figure 1:
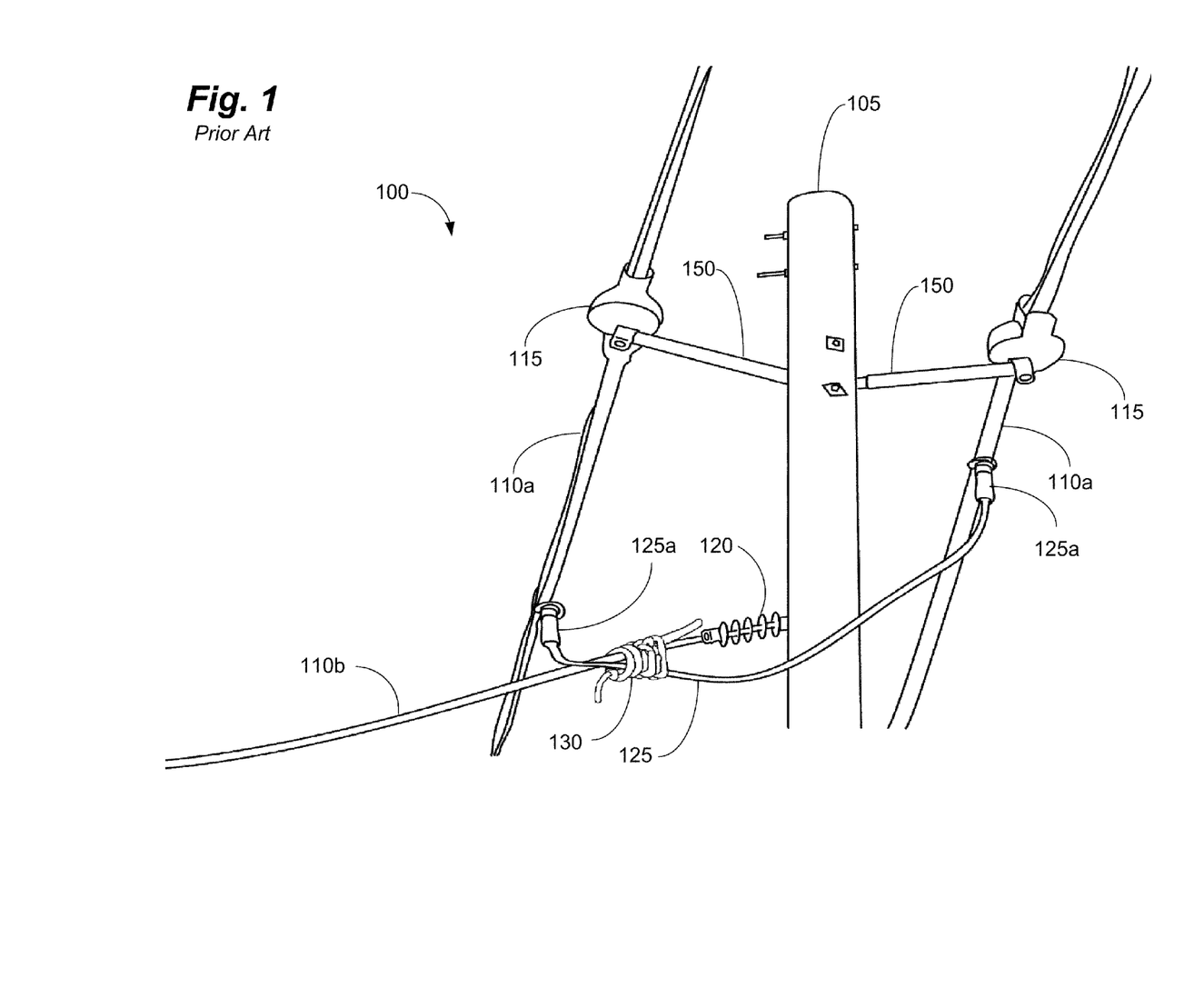
FIG. 1 depicts a perspective view of a jumper installed on a power pole and supported using a conventional rope method.

Referring now to the figures, FIG. 1 illustrates a work area 100, which implements one of many possible combinations of elements on a conventional power pole 105. The power pole 105 can be constructed of a variety of materials such as wood, fiberglass, aluminum, and so on. The pole 105 is generally anchored to the ground sufficiently to support the weight of various elements and a conductor 110. The pole 105 may be driven into the ground, set in concrete, stabilized with guy-wires, and so on, depending on soil conditions, the number, and weight of elements to be supported, and so forth.

FIG. 1 illustrates one possible configuration of a power pole 105, in this case supporting multiple wires 110 (or "conductors"). The conductors 110a can be supported by the pole 105 from below, and can be mounted on pass-through insulators 115. Pass through insulators 115 can enable the wires 110a to be supported by the pole 105 from below, yet insulate the pole 105 from the current traveling therein. In other words, the pass-through insulator 115 can enable the conductor 110a to continue on, while preventing current from the conductor 110a from flowing, or grounding, through the pole 105. This can prevent damage to the pole 105, loss of electrical energy, and possible injury to people or animals, due to electrical shock, should they happen to touch the pole 105.

Another possible configuration is for the conductor 110b to dead end at the pole 105 using a dead end insulator 120. This can be useful, for example, at the end of a street, or simply the end of a particular circuit in the grid. In this case, however, the conductor 110b can terminate at the pole 105, and the end of the conductor 110b can be supported by the insulator 120. Again, the insulator 120 can prevent current flow through the pole 105 to ground.

The conductor 110 can be a stranded or solid wire made of a conductive material (i.e., a material that has minimal resistance to the flow of electricity), often composed of copper, aluminum, or a combination thereof. In order to prevent unwanted discharge of electrical energy, the conductor 110 can be covered in a dielectric or insulating sheath, which can be made of plastic, cloth, or other materials with dielectric properties (i.e., those materials that have a very high resistance to the flow of electricity). Additionally, the conductor 110 can be sized to meet the voltage and current requirements of a particular electrical load (i.e. the voltage and current that must be carried).

One skilled in the art will recognize that this is but one of many possible combinations of components that can be present on a particular power pole 105. For instance, a pole 105 can include more or less conductors 110, a transformer to reduce the voltage (not shown), and/or a switch (also not shown) to enable interruption or routing of power. Regardless, the components are subject to wear and tear from, among other things, weather, wildlife, heat, and electrical fields. The components in the grid, therefore, must be maintained and/or replaced from time to time (the "repair area").

In order to prevent interruption of power on the grid, however, this maintenance is preferably performed without interrupting the flow of electricity to and from the repair area 100. This can be achieved by introducing an additional conductor 125, or "jumper," into the circuit at the power pole 105. The jumper 125 can provide a path for electricity, or "load," to flow around the repair area 100, and can enable components in the repair area 100 to be removed from the circuit for repair or replacement.

In order to carry the load across the repair area 100, the jumper 125 is preferably sized to carry the load. Generally, the jumper 125 must be at least as large as the conductors 110 in the repair area 100 and long enough to span from one conductor 110 to another (i.e., 12-15 feet). For example and not limitation, the jumper 125 can be 2/0 or 4/0 AWG wire or larger depending on the voltage and current in the repair area 100. 4/0 AWG wire, for example, weighs approximately 660 lbs/1000 ft.

The jumper 125 can be attached to the conductors 110 using couplers 125a, which clamps the jumper 125 to the conductor 110 and are conductive. It can be necessary, however, to support the jumper 125 to prevent, among other things, premature failure of the couplers 125a or loss of control of the jumper 125. The length of the jumper 125 can also create a situation where the jumper 125 is hanging in the way of the lineman while he affects repairs. This creates at least two problems: 1) the jumper 125 can cause a tripping or entanglement danger for the lineman and 2) the jumper 125 can come loose from one or both ends.

As mentioned above, the jumper 125 can be quite heavy. If the jumper 125 comes loose from both ends, therefore, it can drop, for example, on the lineman, on his equipment, or on nearby property causing damage. If, on the other hand, the jumper 125 comes loose from only one end, this creates a situation in which the heavy jumper 125 is not only a dropping or swinging hazard, but now is electrically hot. In this case, the jumper 125 is much more dangerous because it also represents an electrocution hazard. For at least the foregoing reasons, control of the jumper 125 at all times in the repair area 100 is essential.

Conventionally, linemen have secured the jumper 125 using a rope 130. The lineman simply uses the rope 130 to tie the jumper 125 to a nearby conductor 110. If the conductor 110 and the jumper 125 are in phase, this is accomplished by simply wrapping the rope 130 around the conductor 110 and the jumper 125 and tying a knot in one or both ends. This can be challenging, however, given the large dielectric gloves linemen are required to wear to protect them from the load.

If the conductors 110 are out of phase, on the other hand, the lineman must first wrap either the jumper 125 or the conductor 110 with a dielectric blanket (not shown) to prevent arcing and then wrap the all three with the rope 130 for support. This makes the job even more difficult for the gloved lineman, as he is now required to manage four items (the conductor 110, the jumper 125, the rope 130, and the dielectric blanket), at least three of which (the jumper 125, the rope 130, and the dielectric blanket) are unsupported and flexible.

Loss of control of both ends of the jumper 125 (i.e. dropping the jumper 125) in the repair area 100 can result in extensive damage caused by the jumper 125 falling onto the service vehicle, surrounding vehicles, or surrounding property. Due to its weight, a single incident involving dropping a jumper 125 onto a car below the repair area 100 can result in thousands of dollars of damage. The jumper 125 can also cause damage to the service vehicle, surrounding buildings, and even landscaping near the repair area 100.

More dangerous, however, is losing control of one end of the jumper 125 in the repair area 100. This can create a situation in which the jumper 125 is "hot," i.e., is electrically connected to the conductor 110. This can result in burns and electrocution to anyone in the vicinity of the repair area 100 including, of course, the lineman. The monetary and emotional costs resulting from a single such incident are incalculable.

Figure 2:
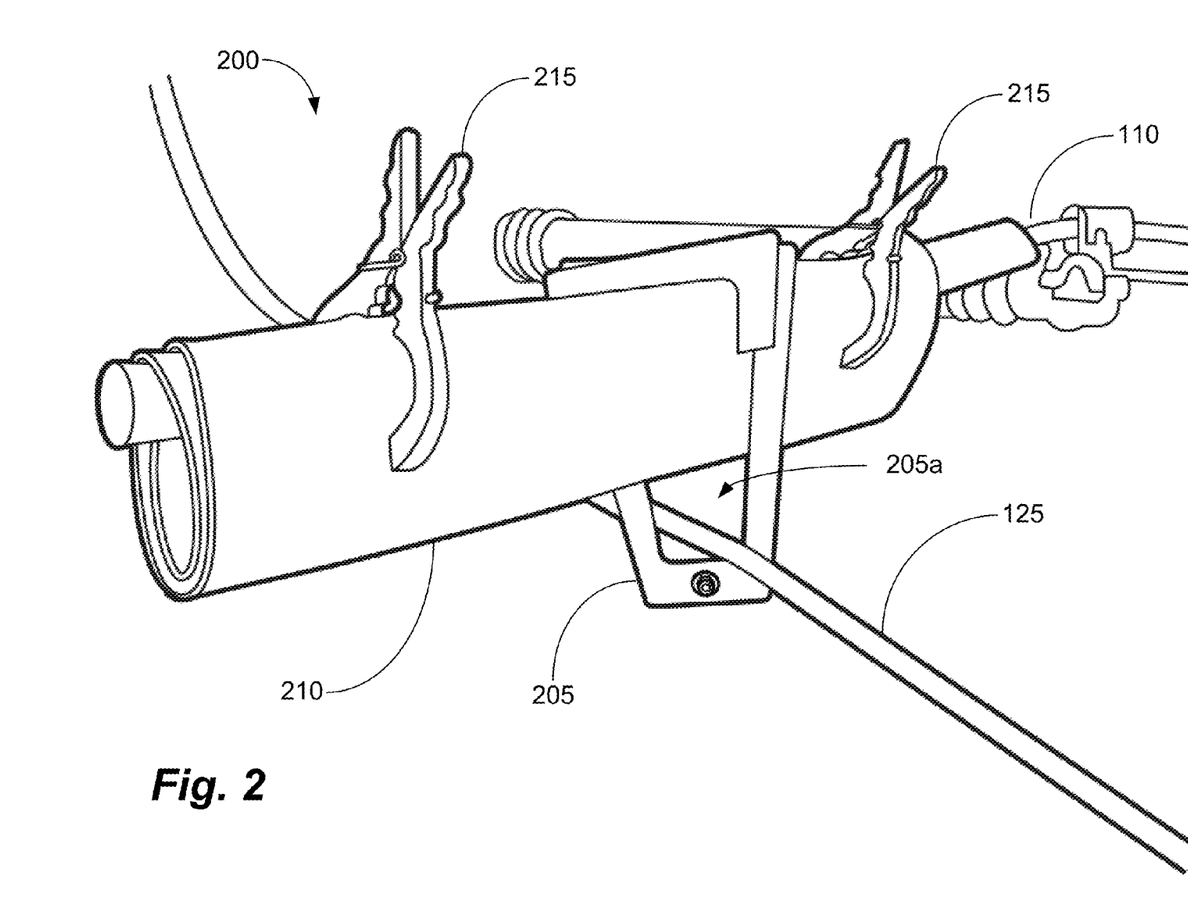
FIG. 2 depicts a perspective view of a power line wrapped in a dielectric blanket and supporting the jumper using a jumper aid, in accordance with some embodiments of the present invention.

As shown in FIG. 2, embodiments of the present invention are directed to providing a device 205, or "jumper aid," that enables linemen to quickly and securely support a jumper 125 during repairs. Embodiments of the present invention provide a solution that can be rated for both the necessary electrical and physical properties. Embodiments of the present invention relate to a tool that can be appropriately rated dielectrically to prevent errant electrical discharges. They can also allow linemen to select the appropriate jumper aid 205—or the appropriate number of jumper aids 205—to support the weight of the jumper 125 being used.

FIG. 2 depicts a repair area 200 similar to that in FIG. 1. As mentioned above, however, the conductor 110 and the jumper 125 can be out of phase. As mentioned above, this can require the use of a dielectric blanket 210, i.e., a blanket that is rated to have a high resistance to the flow of electricity. In some embodiments, the dielectric blanket 210 can be wrapped around the conductor 110 and secured with one or more spring clamps 215, a shown in FIG. 2. In other embodiments, the dielectric blanket 210 can be wrapped around the jumper 125 and similarly secured. In still other embodiments, the dielectric blanket 210 can be secured to the conductor 110 or jumper 125 using other suitable means such as, for example and not limitation, rope, rubber bands, or cable ties.

In some embodiments, after wrapping and securing the dielectric blanket 210 around the conductor 110 or the jumper 125, the lineman can then place the jumper 125 in the open portion 205a of the jumper aid 205. The lineman can then place the jumper aid 205 over the conductor 110 and close the jumper aid 205. Due to the design of embodiments of the jumper aid 205, discussed below, the jumper aid 205 can be easily manipulated by the lineman, despite his heavy work gloves, and can securely support the jumper 125 while repairs or maintenance are carried out.

Figure 3A:
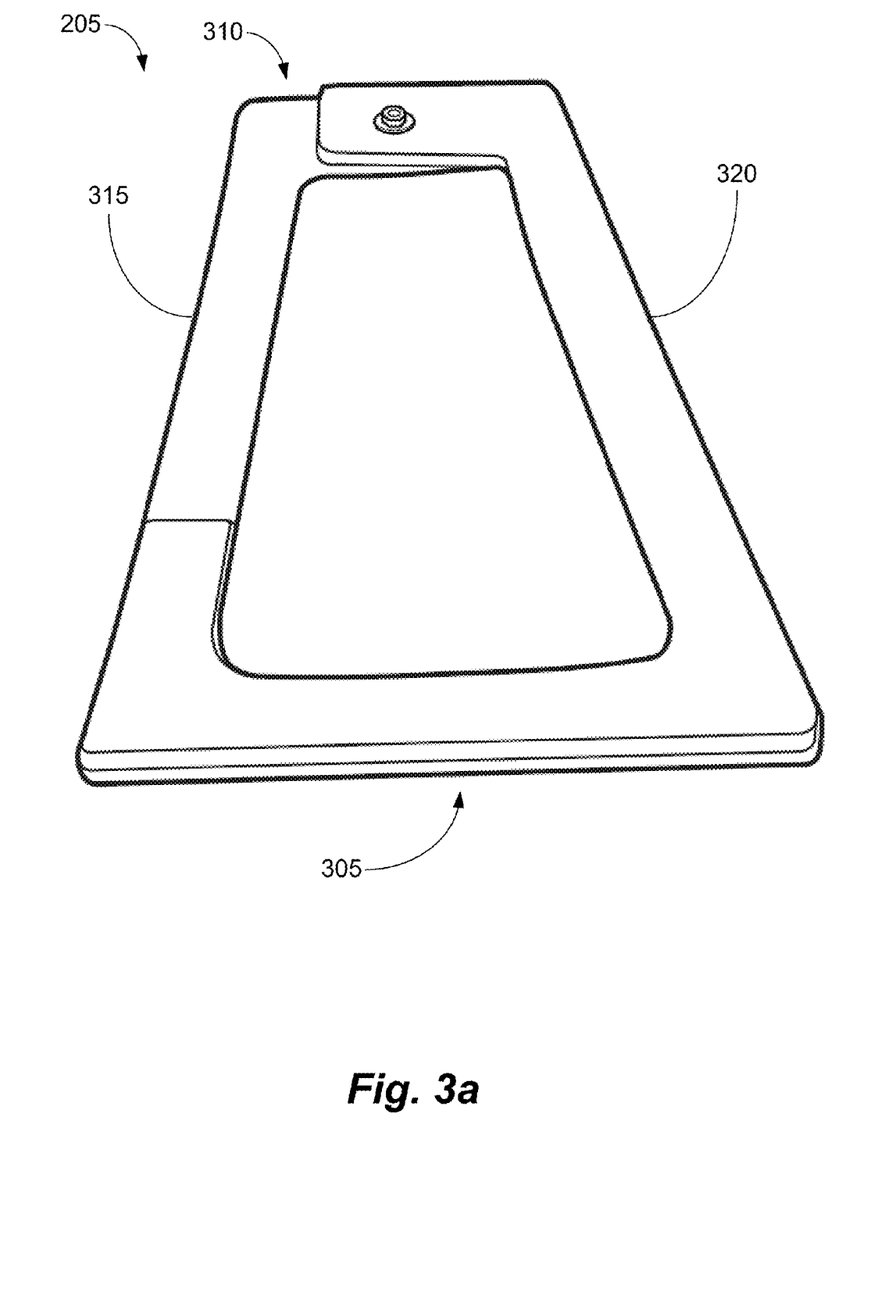
FIG. 3a depicts a perspective view of a trapezoidal embodiment of the jumper aid in a closed position, in accordance with some embodiments of the present invention.
Figure 3B:
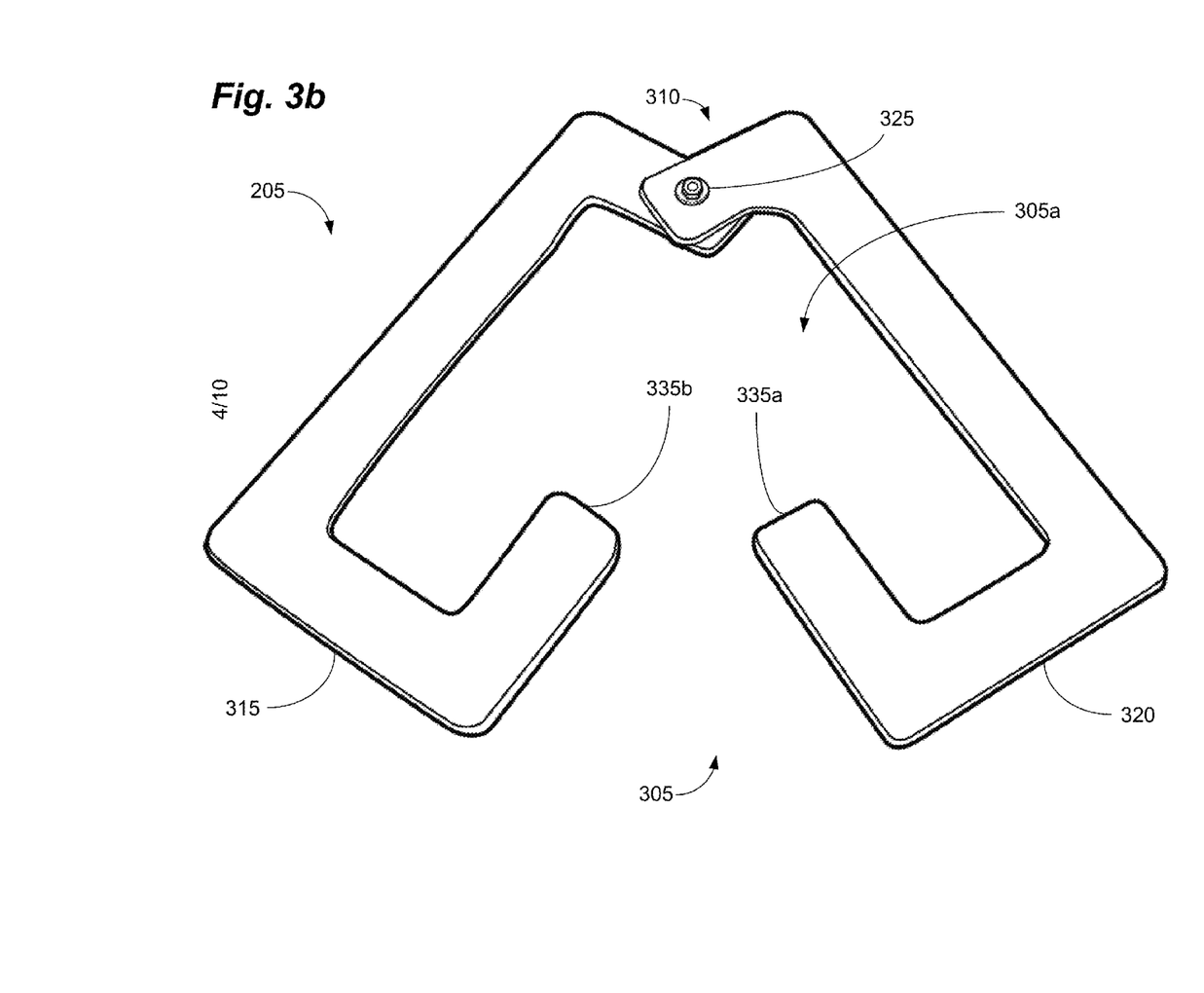
FIG. 3b depicts a perspective view of a trapezoidal embodiment of the jumper aid in an open position, in accordance with some embodiments of the present invention.

In some embodiments, for example, as shown in FIGS. 3a and 3b, the jumper aid 205 can have a generally trapezoidal shape. In other words, the jumper aid 205 can have a large end 305 and a small end 310. This can be useful, for example, when the object being supported is smaller than the supporting structure, or vice-versa. For example, in FIG. 2, the jumper aid 205 is shown in use with the large end 305 around the larger combination of the conductor 110 and the dielectric blanket 210, and the small end 310 around the jumper 125. In other embodiments, however, it can be convenient, or necessary, to wrap the jumper 125 with the dielectric blanket 210, which can make it convenient to use the jumper aid 205 in the opposite orientation, i.e., with the large end 305 supporting the jumper 125 and the small end 310 around the conductor 110.

In some embodiments, shown in FIG. 3b, the jumper aid 205 can comprise a first portion 315 and a second portion 320. In some embodiments, the first portion 315 and the second portion 320 can be pivotally coupled in proximity to their small ends 310 using a pivot 325. In some embodiments, the pivot 325 can comprise a nut and bolt. In other embodiments, the pivot 325 can comprise many suitable devices including, for example and not limitation, a screw, a rivet, or a roll pin.

In some embodiments, the pivot 325 can enable the first portion 315 and a second portion 320 to pivot with respect to each other and to move between a first state, or closed position, FIG. 3a, and a second state, or open position, FIG. 3b. In some embodiments, in the open position, the jumper aid 205 can be placed around objects and can have objects placed in the open area 305a defined by the interior of the first portion 315 and a second portion 320. This can enable, for example, the jumper aid 205 to be placed over a conductor 110 or a jumper 125.

In some embodiments, the jumper aid 205 can have upright portions 335a, 335b extending upwardly from the large end 305 of the first and second portions 315, 320, of the C-shaped element. The upright portions 335 can enable the jumper aid 205 to remain in the closed position once placed around the object to be supported and the support structure. In other words, when a weight, such as the weight of the jumper 125 is placed in the jumper aid 205 and the jumper aid is hung on the conductor 110, for example, the natural tendency of the jumper aid 205 would be to open and drop the jumper 125. When the jumper aid 205 begins to open, however, the uprights 335 contact the object occupying the large end 305 of the jumper aid 205 and prevent it from opening.

Referring back to FIG. 2, for example, the jumper aid 205 can be placed in the open position and the jumper 125 can be placed inside the jumper aid 205. The jumper aid 205 can then be placed around the conductor 110 and, if applicable, around the dielectric blanket 210 and moved to the closed position. When released, the weight of the jumper 125 would tend to force the jumper aid open 205. As the jumper aid 205 moves towards the open position, however, the uprights 335 can contact the dielectric blanket 210 and the conductor 110, and the jumper aid 205 is prevented from opening.

Figure 4A:
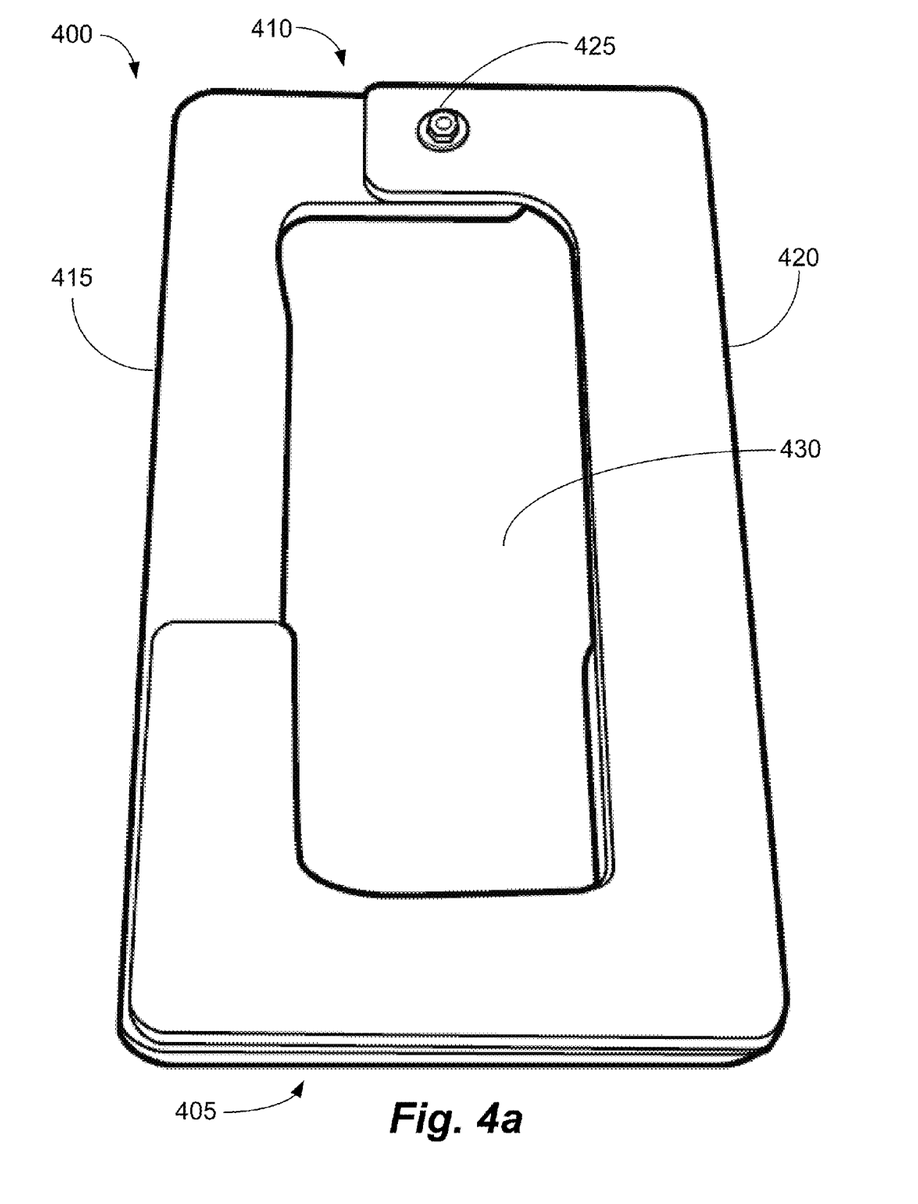
FIG. 4a depicts a perspective view of a rectangular embodiment of the jumper aid in a closed position, in accordance with some embodiments of the present invention.
Figure 4B:
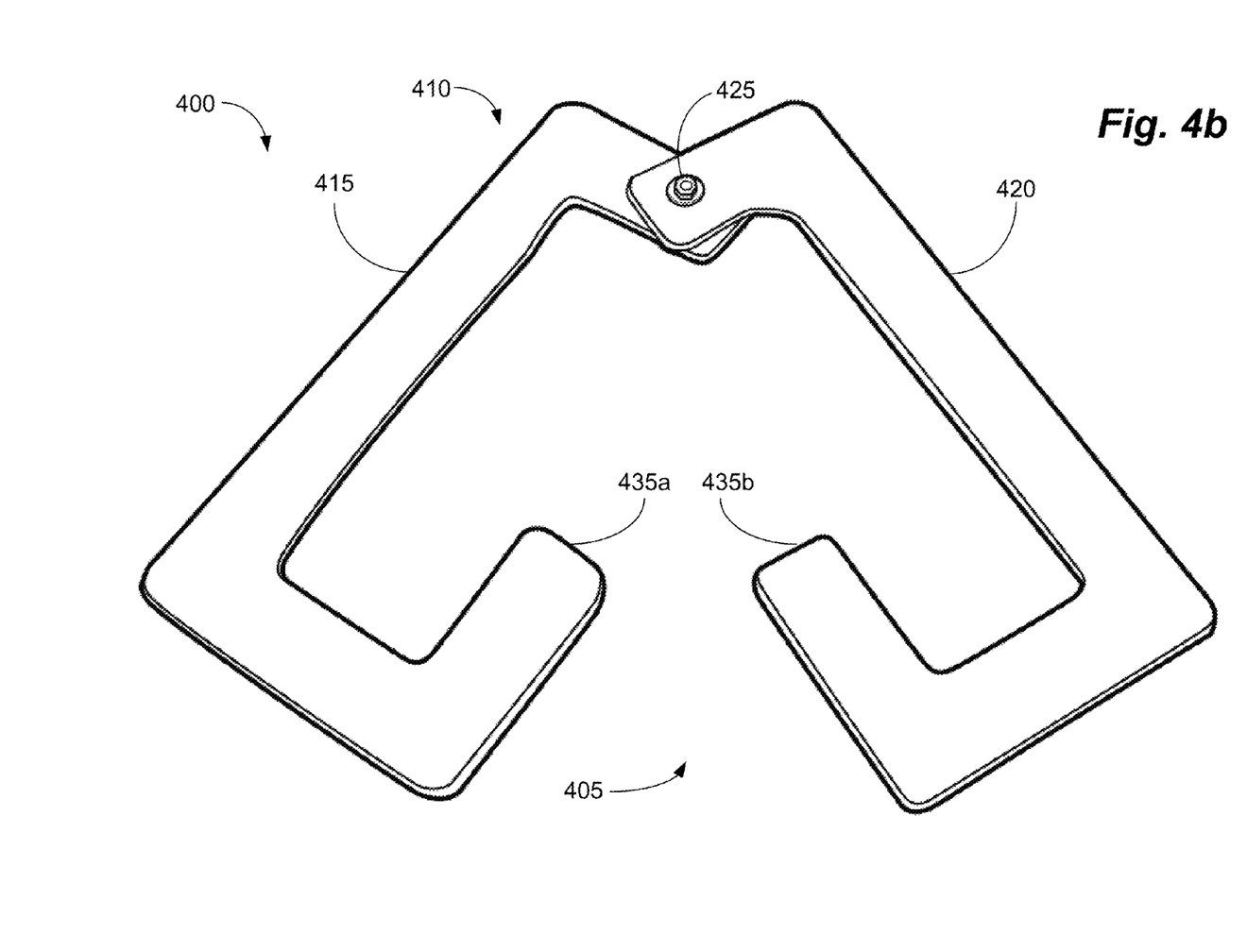
FIG. 4b depicts a perspective view of a rectangular embodiment of the jumper aid in an open position, in accordance with some embodiments of the present invention.

In other embodiments, shown in FIGS. 4a and 4b, the jumper aid 400 can have a generally rectangular shape. In other words, both ends 405, 410 of the jumper aid 400 can have substantially the same dimensions. This can be useful, for example, when the object being supported is relatively the same size as the supporting structure. For example, the jumper aid 400 could be used to replace the rope 130, shown in FIG. 1; because the dielectric blanket 210 may not be required (i.e. the conductors 110 in the repair area 100 are in phase). Because both the jumper 125 and the conductor 110 can be similar in size, it can be convenient to use the rectangular jumper aid 400 to prevent slipping and cocking of the jumper aid 205 on the jumper 125 or conductor 110.

In some embodiments, shown in FIG. 4b, the jumper aid 400 can comprise a first portion 415 and a second portion 420 of the C-shaped element. In some embodiments, the jumper aid 400 can have a first end 410 and a second end 405. In some embodiments, the first end 410 and the second end 405 can be substantially equal in length. In some embodiments, the first portion 415 and the second portion 420 can be pivotally coupled in proximity to the first end 410 using a pivot 425. In some embodiments, the pivot 425 can comprise a nut and bolt 425. In other embodiments, the pivot 425 can comprise many suitable devices including, for example and not limitation, a screw, a rivet, or a roll pin.

In some embodiments, the pivot 425 can enable the first portion 415 and a second portion 420 to pivot with respect to each other and move between a first and second state, e.g., a closed position (FIG. 4a) and an open position (FIG. 4b). In some embodiments, in the open position, the jumper aid 400 can be placed around objects and can have objects placed in the open area 430 defined by the interior of the first portion 415 and a second portion 420. This can enable, for example and not limitation, the jumper aid 400 to be placed over a conductor 110 or a jumper 125.

In some embodiments, the jumper aid 400 can have upright portions 435a, 435b extending upwardly from the non-pivoting end 405. The upright portions 435 can enable the jumper aid 400 to remain in the closed position when placed around the object to be supported and the support structure. In other words, when a weight, such as the weight of the jumper 125 is placed in the jumper aid 400 and the jumper aid is hung on the conductor 110, for example, the natural tendency of the jumper aid 400 would be to open and drop the jumper 125. When the jumper aid 400 begins to open, however, the uprights 435 contact the object occupying the large end 405 of the jumper aid 400 and prevent it from opening.

In some embodiments, therefore, the jumper aid 205, 400 provides a tool that can be used to support a variety of heavy objects from a supporting structure and can remain closed by design rather than through the use of friction, fasteners, or additional means. This design can prevent wear and tear, because the surfaces of the jumper aid 205, 400 and/or pivot 325, 425 are not used to frictionally retain the jumper aid 205, 400 in the closed position. The jumper aid 205, 400 also obviates the need to have additional pins or fasteners to pin closed, or otherwise fix, the non-pivoting end 305, 405 of the jumper aid 205, 400. This can eliminate small parts, such as pins or bolts, used to keep the jumper aid 205, 400 closed, which can be lost or dropped during use.

In some embodiments, the first portion 315, 415 and the second portion 320, 420 of the jumper aid 205, 400 can comprise a dielectric material. This can enable the jumper aid 205, 400 to be used without fear that the load carried by the jumper 125 or the conductor 110 will be transmitted through the jumper to the lineman or to ground. In some embodiments, the jumper aid 205, 400 can have a dielectric rating. In other embodiments, the opening 330, 430 in the jumper aid 205, 400 can be sized to provide a large enough air gap to preclude the use of a dielectric blanket 210, regardless of phase or voltage concerns.

In some embodiments, the first portion 315, 415 and the second portion 320, 420 of the jumper aid 205, 400 can comprise a material rated for strength. In other embodiments, the jumper aid 205, 400 can be rated for strength as a unit, i.e., the jumper aid 205, 400 can have a maximum load rating. In other embodiments the pivot 325, 425 can determine the maximum load rating of the jumper aid 205, 400, and can provide a sacrificial failure point for the jumper aid 205, 400. This can enable the pivot 325,425 to break when the jumper aid 205, 400 is overloaded. This can enable the jumper aid 205, 400 to be repaired by replacing the pivot 325, 425 and prevent additional damage to the jumper aid 205, 400, namely the first portion 315, 415 and the second portion 320, 420.

Figure 5:
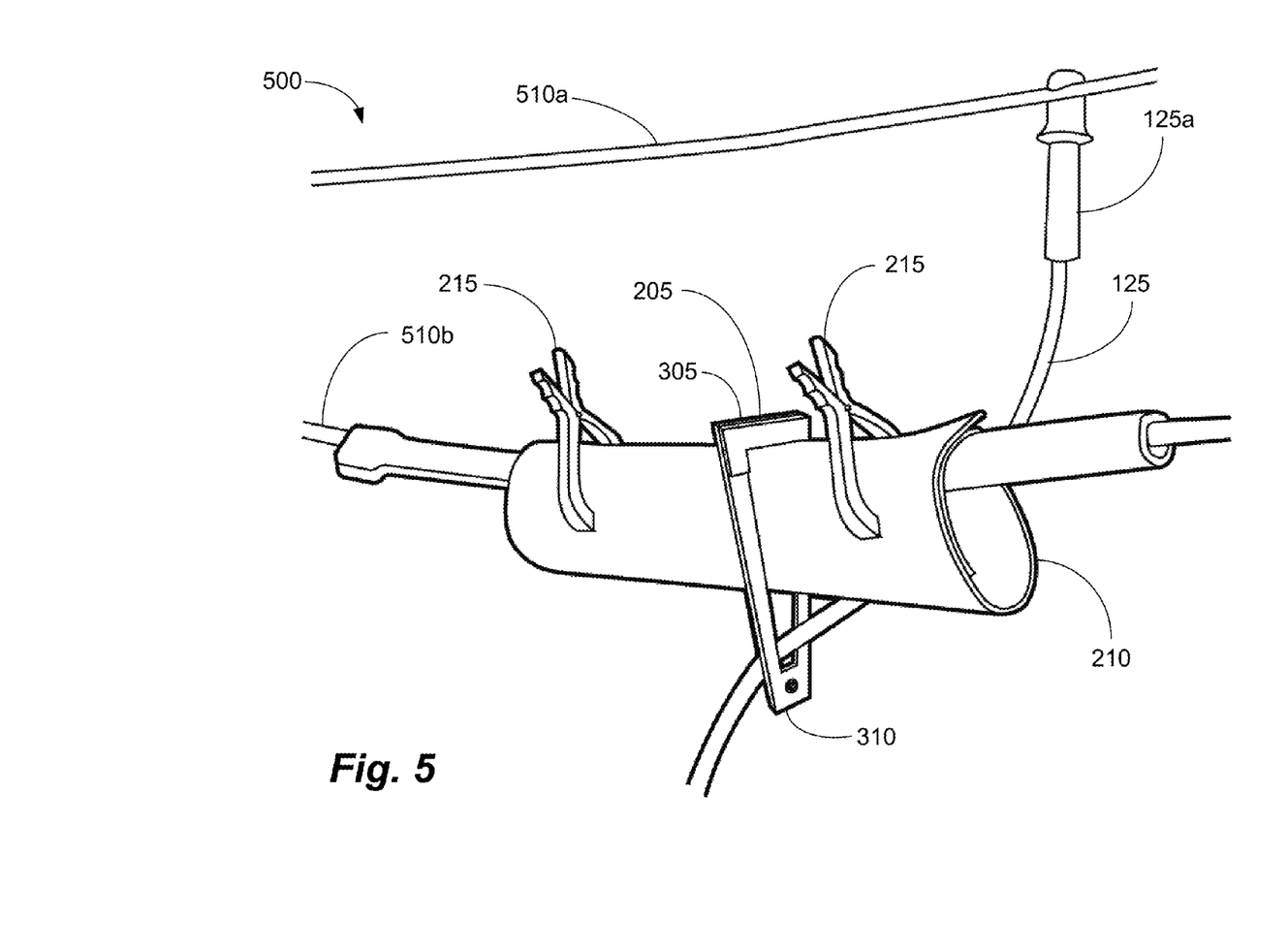
FIG. 5 depicts another perspective view of a power line wrapped in a dielectric blanket and supporting the jumper using the jumper aid, in accordance with some embodiments of the present invention.

In some embodiments, e.g., as shown in FIG. 5, the jumper aid 205 can be used to suspend a jumper 125 from a conductor 510b in the work area 500. In this instance, the jumper 125 can be used to connect one conductor 510a to another conductor (not shown) to prevent the interruption of power through the grid. In some embodiments, the conductor 510b can be wrapped in a dielectric blanket 210. In some embodiments, the dielectric blanket 210 can be held in place with clamps 215 to prevent it from unfurling or dropping off the conductor 510b. In this configuration, it can be convenient to place the large end 305 of the jumper aid 205 over the conductor 510b and blanket 210. In this configuration, the smaller jumper 125 can be securely retained in the small end 310 of the jumper aid 205, which minimizes movement and twisting of the jumper.

Figure 6:
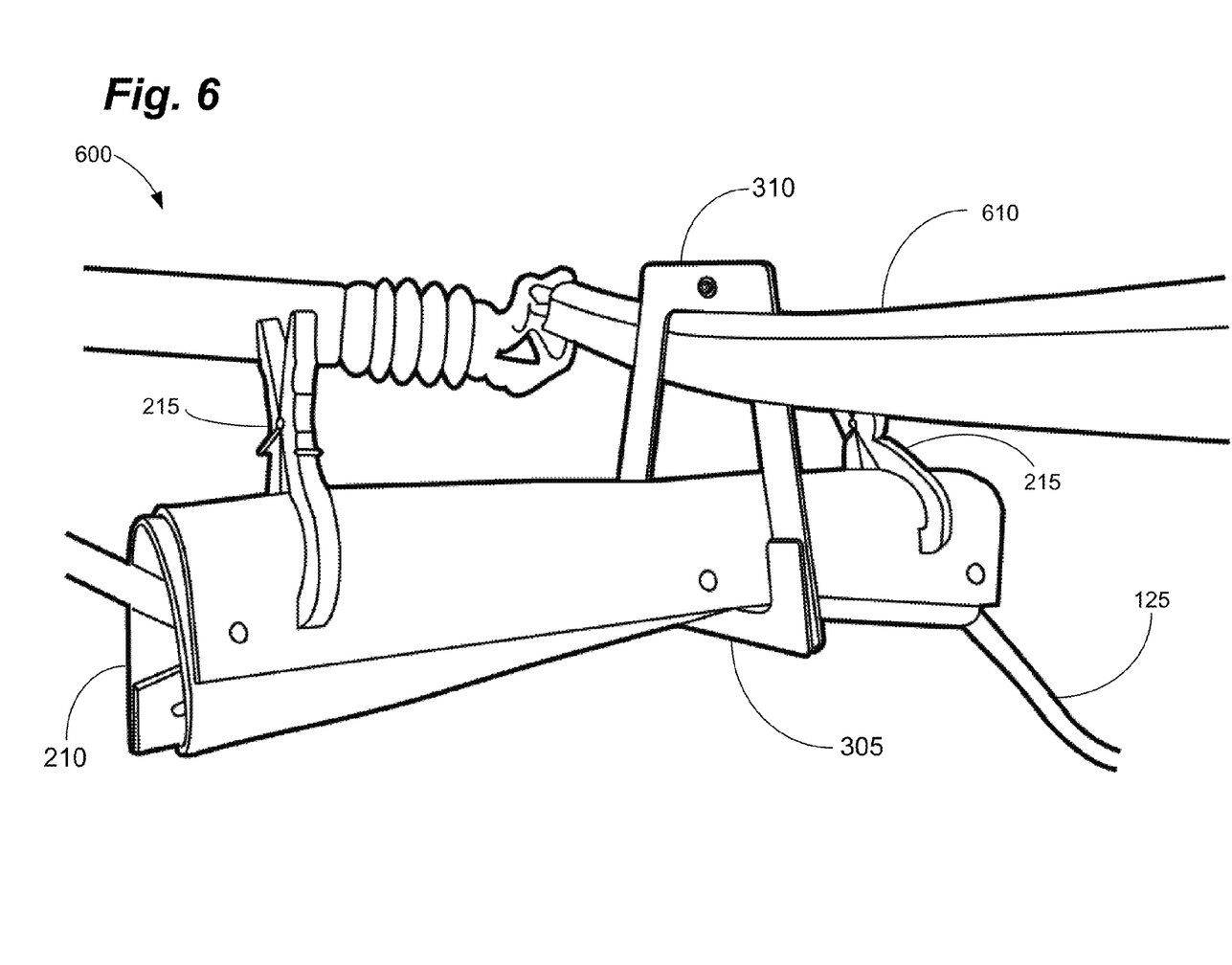
FIG. 6 depicts a perspective view of the jumper wrapped in a dielectric blanket supported by a power line the jumper aid, in accordance with some embodiments of the present invention.

In other embodiments, shown in FIG. 6, it can be necessary or convenient to wrap the jumper 125 in the dielectric blanket 215. This can be due to, for example and not limitation, components installed in the work area 600 or the layout of the various conductors 610. In this configuration, it can be convenient to install the jumper aid 205 in the opposite direction. In other words, the jumper aid can be installed with the jumper 125 and the dielectric blanket 210 in the large end 305 and the conductor 610 in the small end 310. Again, this minimizes the slipping and/or twisting of the smaller, bare conductor 610 inside the jumper aid 205.

Figure 7:
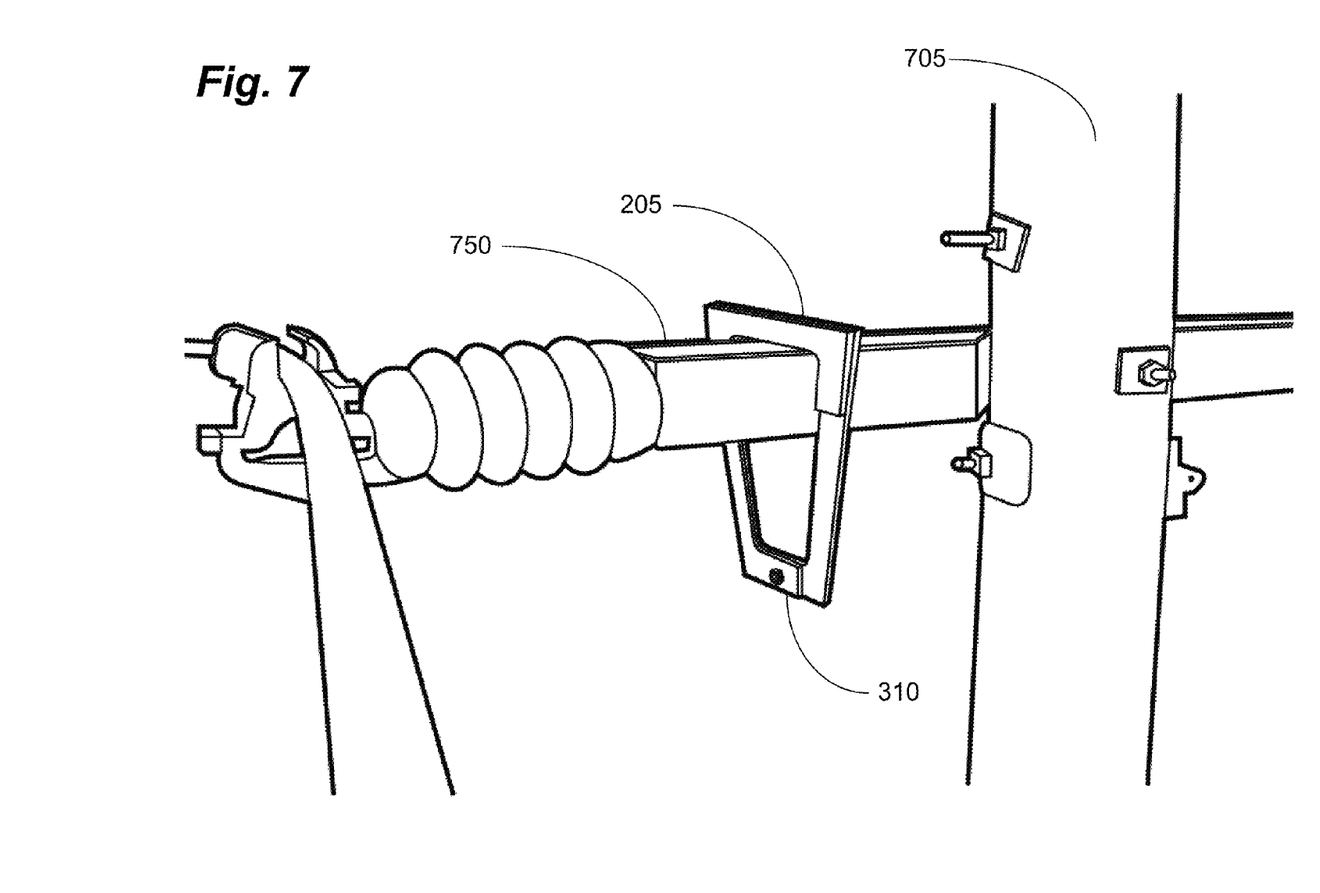
FIG. 7 depicts a perspective view of the jumper aid hanging on a cross arm on a power pole, in accordance with some embodiments of the present invention.

In other embodiments, the configuration of the jumper aid 205 can enable the jumper aid 205 to be supported by, and to support, many objects present in the work area. In some embodiments, for example and not limitation, the jumper aid 205 can be placed over the cross bar 750 of the power pole 705. See, FIG. 7. In some embodiments, the trapezoidal shape of the jumper aid 205, 400 can enable the lineman to determine which end better fits the object to be supported, or the object from which the jumper aid 205 is supported. For example, as shown in FIG. 7, on some power poles 705 the cross bar 750 can be wide and prevent hanging the jumper aid 205 using the small end 310. In other embodiments, however, the cross bar 150 can be a smaller, which can make use of the small end 310 of the jumper aid 205 more desirable. See, FIG. 1 (showing a smaller, round cross bar in use).

Figure 8:
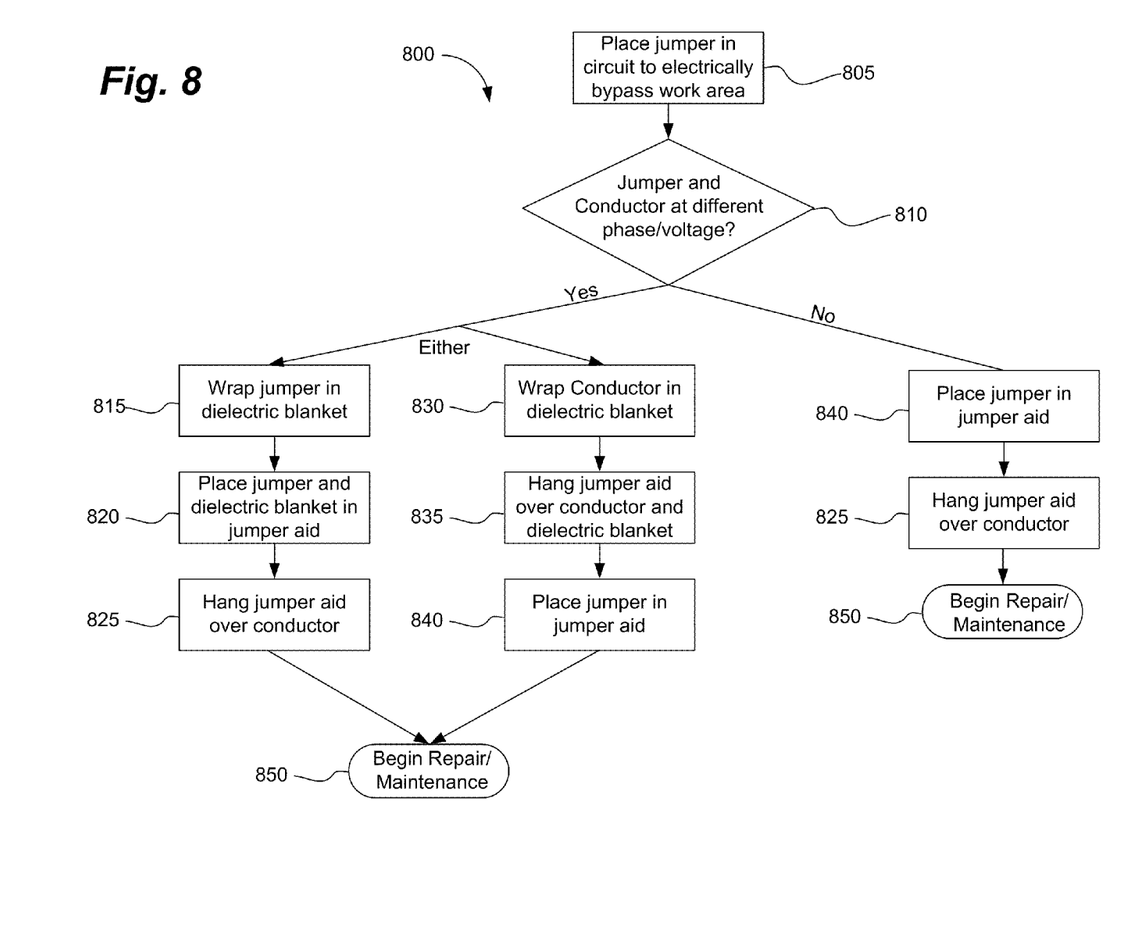
FIG. 8 is a flow chart depicting a method of using the jumper aid, in accordance with one embodiment of the present invention.

Embodiments of the present invention also relate to a system and method for installing a jumper in a work area 800, the features of which are outlined below and shown in FIG. 8. As mentioned above, it can be necessary from time to time to repair and/or replace certain components in a given work area. It is generally desirable, however, to facilitate repairs without interrupting power to the grid. This can be accomplished by placing a jumper into the circuit 805 to bypass the work area. Use of a dielectric blanket, as mentioned above, can be helpful if the jumper and the conductor from which it will be supported are at a different phases and/or voltages 810.

In some embodiments, if the jumper and conductor are at different phases or voltages, the jumper can be wrapped in a dielectric blanket 815, which can prevent arcing, i.e., the errant discharge of electricity, between the jumper and the conductor. The lineman can then place the jumper and dielectric blanket into the jumper aid 820 and hang the jumper aid over the conductor 825. This method can ease the task of handling the bulky jumper and dielectric blanket, which can then be hung over the conductor as a unit 825. With the jumper wrapped in the dielectric blanket and securely hung from the conductor, the lineman can safely begin work 850 with the jumper safely suspended, retained, and out of his work space.

In other embodiments, it can be desirable to wrap the conductor with the dielectric blanket as opposed to the jumper. This can be desirable, for example, if the work area is particularly tight in the vicinity of the conductor. In this case, the conductor can be wrapped in the dielectric blanket 830 and the jumper aid can then be hung over the conductor and the dielectric blanket 835. In this configuration, the bare jumper is less cumbersome and can easily be placed in the jumper aid 840. With the conductor wrapped in the dielectric blanket and the jumper securely hung from the conductor, the lineman can safely begin work 850 with the jumper safely suspended, retained, and out of his work space.

In still other embodiments, the jumper and the conductor can be at the same phase and voltage 810. This configuration can obviate the need to use a dielectric blanket because, for example, there is no voltage potential between the jumper and the conductor. In some embodiments, therefore, the jumper can be placed in the jumper aid 840 and the jumper aid can be hung over the conductor 825. With the jumper securely hung from the conductor, the lineman can safely begin work 850 with the jumper safely suspended, retained, and out of his work space.

While several possible methods are disclosed above, embodiments of the present invention are not so limited. For instance, the jumper aid can be hung from the conductor 825 and then the jumper could be placed in the jumper aid 840 without departing from the spirit of embodiments of the invention. The order used for various features of the method can be varied according to a particular work area that requires a slight variation in the method due to, for example, space constraints. Such changes are intended to be embraced within the scope of the invention.

From the forgoing, it can be seen that embodiments of the present invention provide a device 205, 400, system and method 800 for safely installing a jumper 125 in a work area 500,600. In some embodiments, the present invention is a jumper aid 205, 400 capable of safely supporting a jumper 125 from a conductor 110 in the work area 500, 600. In some embodiments, the jumper aid 205,400 can comprise uprights 335, 435 that prevent the jumper aid 205, 400 from opening inadvertently. In some embodiments, the jumper aid 205, 400 can comprise a strong, dielectric material to safely suspend a jumper 125 and prevent the jumper 125 from obstructing the work area 500, 600.

From the foregoing, it can also be seen that embodiments of the invention provide a number of different systems and methods 800, which can be used to safely control a jumper 125 within a work area 500,600. The system can be easily installed, and provides a safe solution to this ubiquitous problem. The various embodiments of the invention described above provide methods of installing the system when compared with prior approaches.

It will be appreciated by those skilled in the art, however, that the invention can be embodied in other specific forms without departing from the spirit or essential characteristics thereof. For example, embodiments of the invention have been described with respect to a method of installing the jumper aid 205, 400; however, the method 800 could be installed using a different sequence of steps, or omitting certain steps, without deviating from the spirit of the invention. In addition, while the invention has been described in the context of device for suspending a jumper 125 from a conductor 110, the concepts described herein need not be limited to these illustrative embodiments. For example, embodiments of the present invention could be used to hang a variety of items from a variety of support structures. Embodiments of the present invention could be used, for example and not limitation, to hang a bicycle from a garage support.

The specific configurations, choice of materials, and the size and shape of various elements could be varied according to particular design specifications or constraints requiring a device, system, or method constructed according to the principles of the invention. Such changes are intended to be embraced within the scope of the invention. The presently disclosed embodiments, therefore, are considered in all respects to be illustrative and not restrictive. The scope of the invention is indicated by the appended claims, rather than the foregoing description, and all changes that come within the meaning and range of equivalents thereof are intended to be embraced therein.

What is claimed is:

1. A method comprising:
   coupling an electrical jumper to a first conductor and a second conductor such that the first conductor and the second conductor are electrically continuous; and
   supporting the electrical jumper from one of the first conductor or the second conductor with a pivotable device;
   wherein the pivotable device comprises:
      a first C-shaped element comprising a first end and a second end, and further comprising a first upright portion; and
      a second C-shaped element comprising a first end and a second end, and further comprising a second upright portion;
      wherein the first C-shaped element is disposed in a substantially opposing manner to the second C-shaped element; and
      the first C-shaped element is pivotally coupled to the second C-shaped element in proximity to the first ends of each of the first and second C-shaped elements;
      wherein the first and second upright portions are disposed on the second ends and extend toward the first ends of the first and second C-shaped elements, respectively; and
      wherein the first and second upright portions contact one or more of the electrical jumper, the first conductor, or the second conductor, to prevent the pivotable device from opening when loaded.

2. The method of claim 1, further comprising:
   encircling the electrical jumper with a dielectric blanket before supporting the electrical jumper with the pivotable device.

3. The method of claim 2, wherein the upright portions contact the dielectric blanket to prevent the pivotable device from opening when loaded.

4. The method of claim 1, further comprising:
   encircling one of the first conductor and the second conductor with a dielectric blanket before supporting one of the first conductor or the second conductor with the pivotable device.

5. The method of claim 4, wherein the upright portions contact the dielectric blanket to prevent the pivotable device from opening when loaded.

6. The method of claim 1, wherein the first and second upright portions are disposed at an angle of between approximately 60 degrees and 120 degrees to a lower portion of the first and second C-shaped elements.

7. The method of claim 4, the pivotable device comprising an open state for receiving a portion of the jumper, and a closed state for securing the jumper.

8. The method of claim 1, wherein the pivotable device comprises a dielectric material.

9. The method of claim 1, wherein an upper portion of the C-shaped elements are shorter than a lower portion of the C-shaped elements.

10. A system comprising:
    an electrical jumper connected to a first conductor and a second conductor for bypassing current flow from the first conductor to the second conductor; and
    a pivotable device for supporting the electrical jumper from one of the first conductor and the second conductor in the work area;
    wherein the pivotable device comprises:
       a first C-shaped element comprising a first end and a second end, and further comprising a first upright portion; and
       a second C-shaped element comprising a first end and a second end, and further comprising a second upright portion;
       wherein the first C-shaped element is disposed in a substantially opposing manner to the second C-shaped element; and
       the first C-shaped element is pivotally coupled to the second C-shaped element in proximity to the first ends of each of the first and second C-shaped elements;
       wherein the first and second upright portions are disposed on the second ends and extend toward the first ends of the first and second C-shaped elements, respectively; and
       wherein the first and second upright portions contact one or more of the electrical jumper, the first conductor, or the second conductor, to prevent the pivotable device from opening when loaded.

11. The system of claim 10, wherein the pivotable device is substantially trapezoidal.

12. The system of claim 10, wherein the pivotable device is substantially rectangular.

13. The system of claim 10, wherein the first and second upright portions are disposed at an angle of between approximately 60 degrees and 120 degrees to a lower portion of the first and second C-shaped elements.

14. A pivotable device for supporting the weight of an object from a support comprising:
    a first substantially C-shaped element comprising a first end and a second end, and further comprising a first upright portion; and a second substantially C-shaped element comprising a first end and a second end, and further comprising a second upright portion;

wherein the first substantially C-shaped element is pivotally coupled to the second substantially C-shaped element, in proximity to the first ends of each substantially C-shaped element, enabling the pivotable device to move between an open position and a closed position;

wherein the second substantially C-shaped element is disposed in an opposing manner to the first substantially C-shaped element such that the first substantially C-shaped element and the second substantially C-shaped element define a space therebetween;

wherein the first and second upright portions are disposed on the second ends and extend toward the first ends of the first and second substantially C-shaped elements, respectively, and prevent the pivotable device from moving to the open position when the pivotable device supports an object; and wherein the upright portions contacts one of the object or the support and prevents the pivotable device from moving to the open position until the object is removed from the pivotable device.

15. The device of claim 14, wherein the object is an electrical jumper.

16. The device of claim 14, wherein the first substantially C-shaped element and the second substantially C-shaped element comprise a dielectrically rated material.

17. The device of claim 14, wherein the first ends of the substantially C-shaped elements are shorter than the second ends of the substantially C-shaped elements.

18. The system of claim 17, wherein the pivotable device is substantially trapezoidal.

19. The system of claim 17, wherein the pivotable device is substantially rectangular.

* * * * *